US012753095B2

(12) United States Patent
Swogger et al.

(10) Patent No.: US 12,753,095 B2
(45) Date of Patent: Oct. 6, 2026

(54) WASTE WATER TREATMENT PROCESS

(71) Applicant: US CLEAN WATER TECHNOLOGY, LLC, Austin, TX (US)

(72) Inventors: Kurt W. Swogger, Austin, TX (US); John Richard Graves, Clifton, TX (US); Phillip J. Carlberg, Austin, TX (US)

(73) Assignee: US CLEAN WATER TECHNOLOGY, LLC, Austin, TX (US)

( * ) Notice: Subject to any disclaimer, the term of this patent is extended or adjusted under 35 U.S.C. 154(b) by 1237 days.

(21) Appl. No.: 16/781,676

(22) Filed: Feb. 4, 2020

(65) Prior Publication Data

US 2021/0171368 A1 Jun. 10, 2021

Related U.S. Application Data

(60) Provisional application No. 62/801,052, filed on Feb. 4, 2019.

(51) Int. Cl.
*C02F 1/46* (2023.01)
*C02F 1/40* (2023.01)
(Continued)

(52) U.S. Cl.
CPC ................ *C02F 1/463* (2013.01); *C02F 1/40* (2013.01); *C02F 1/46109* (2013.01);
(Continued)

(58) Field of Classification Search
CPC ........ C02F 1/463; C02F 1/40; C02F 1/46109; C02F 2001/46119; C02F 2001/46138;
(Continued)

(56) References Cited

U.S. PATENT DOCUMENTS

2014/0263094 A1* 9/2014 Quicksall .............. C02F 1/4674 210/192
2015/0166383 A1* 6/2015 Visnja .................... B01D 21/00 204/229.4

(Continued)

OTHER PUBLICATIONS

WO 2012151617 to Robinson; 2012.*

*Primary Examiner* — Zulmariam Mendez
(74) *Attorney, Agent, or Firm* — HUNTON ANDREWS KURTH LLP

(57) ABSTRACT

A waste water treatment system utilizing a series of individual modules which, when assembled, form a beginning contaminate collection chamber attached at the starting end of a main fluid treatment tank, in which is housed an array of anodes and cathodes. A center contaminate collection chamber can be attached at the oppose end of the main treatment tank which provides an internal fluid pathway to allow fluid transfer from the first treatment tank into a second treatment tank. Alternatively, the center contaminate collection chamber can be used when multiples of treatment tanks are assembled to work in tandem, or an ending contaminate collection chamber can be attached to an ending treatment module to complete the expandable waste water treatment system.
Expandability of the system can therefore accommodate various waste water treatment mechanisms, residence time and manner of treatment.

17 Claims, 7 Drawing Sheets

(51) Int. Cl.
*C02F 1/461* (2023.01)
*C02F 1/463* (2023.01)
*C02F 101/32* (2006.01)

(52) U.S. Cl.
CPC ............... *C02F 2001/46119* (2013.01); *C02F 2001/46138* (2013.01); *C02F 2001/46171* (2013.01); *C02F 2101/32* (2013.01); *C02F 2201/4611* (2013.01); *C02F 2201/4617* (2013.01)

(58) Field of Classification Search
CPC ........ C02F 2001/46171; C02F 2101/32; C02F 2201/4611; C02F 2201/4617
See application file for complete search history.

(56) References Cited

U.S. PATENT DOCUMENTS

2015/0203375 A1* 7/2015 Green .................. C02F 1/4672 204/267
2017/0081219 A1* 3/2017 Taylor .................... C02F 1/463

* cited by examiner

WASTE WATER TREATMENT PROCESS

CROSS REFERENCE TO RELATED APPLICATIONS

This application is related to U.S. Pat. No. 9,896,355, the entire disclosure of which is herein incorporated by reference in its entirety. This application claims priority from U.S. Provisional 62/801,052 filed Feb. 4, 2019, the entire disclosure of which is herein incorporated by reference in its entirety.

FIELD OF THE INVENTION

In general the present invention relates to a modular waste water treatment process in which a series of modules can be assembled to form a waste water treatment system.

BACKGROUND AND RELATED ART

According to recent reports based on three years of research, in approximately 25 years, fresh water may be very scarce. Studies indicated that the entire world's population may go require more water by 2040. Remarkably by 2020, between 30 and 40 percent of the world's population could be adversely affected by water shortages.

International water shortages now are commonly being experienced where ongoing demands continue for agriculture and manufactured goods to supply an ever growing population. This valuable water resource is rapidly also diminishing due to ongoing world-wide droughts and the global pollution of lakes, rivers and our oceans.

Due to looming shortages, waste water recycling for manufacturing could become extremely important, not only for environmental aspects, but also to the rising costs associated with waste water treatment and water handling.

Over the years a wide variety of processes have been developed to perform waste water treatment. Typically most waste water treatment methods rely on chemical clarifiers, filters or filtration by membranes to separate contaminates or their sub-constituents from a waste water stream. Filters and membranes provide micron or submicron filtration and are commonly used to remove chemicals, salts, metals and aquatic microorganisms.

U.S. Pat. No. 7,815,804 B2 to Nagghapan, is an example of a filter and membrane system which are combined and used in the treatment of a waste water stream. Nagghapan teaches the use of ion exchange followed by a filtration and membrane process to remove total suspended solids, (TSS) and total dissolved solids, (TDS) from the fluid).

Both filtration and membrane systems rely on pumps to move and push fluid through the filtration system. Contaminate volume is typically based on milligrams per liter, (mg./l) and where the life span of the filter or membrane system can be determined by the contaminate levels and to the volume of water being subjected to the filtration process. Most filters and membrane processes are maintenance intensive and are costly to replace, Waste water treatment can also include the use of chemicals for the removal of organics and the neutralization of some types of inorganic contaminate. However, the downfall of chemical treatment is the tradeoff between the treatments of harmful inorganics in exchange for potential harmful chemicals. U.S. Pat. No. 4,035,289A to Guillerrne, Gratacos, Sirnins and Tramier teaches a method to flocculate organics with chemical agents and then the acidification of the effluent for pH balancing. Chemical treatments typically require time for activation to produce a desirable treatment result.

Electrocoagulation processes are commonly used in the treatment of waste water. Electrocoagulation involves the use of electrical current being applied to an anode and cathode and where molecular compounds can be disassociated or oxidized by means of current transfer within the influent. As for example in electrolysis, molecular disassociation of water takes place once 1.24 volts bas been applied to an anode and cathode, breaking down water molecules to produce both hydrogen and oxygen which forms a gaseous vapor consisting of micro bubbles.

Similar to water, other bi-polar molecular compounds can be disassociated by applying voltage to a waste water stream; See for example, http://en.wikipedia.org/wiki/Chemical polarity.

The waste water acts as an electrolyte for voltage transfer between an anode and cathode, and where electro-negative or bi-polar molecules electrically react with the inputted voltage.

U.S. Pat. No. 4,035,289A to Huang, Huang, Lee and Lin teach the method of electrolytic compound reductions using ferric ions to improve a fluidized carrier, and thus a high proportion of iron (III) to iron (II) can be sustained in the system to purify waste water. However, this method requires the continual addition of hydrogen peroxide to the influent for the treatment process.

U.S. Pat. No. 4,014,766A to Watanabe and Nojiri teach a method where waste water is subjected to electrolysis within an electrolytic cell having an anode comprising as insoluble central electrode and where a body of iron particulate is disposed there around and in electrical contact therewith, whereby impurities in the waste water become occluded within a flocculation of iron hydroxide formed by electrolytic dissolution of the iron pieces, and the flocculation containing the impurities is subjected to oxidation processing and is thereafter separated. A magnetic field can be applied to the waste water thus treated to thereby promote sedimentation of the flocculation.

China patent CN 103266330A discloses an electrolysis process utilizing a plurality of bipolar membranes within a series of tanks. The bipolar membrane polar distance electrolysis tank comprises a plurality of unit electrolysis tanks and semi-unit electrolysis tanks at two ends, an ion membrane and a sealing gasket being arranged among the plurality of unit electrolysis tanks and between the unit electrolysis tanks and the semi-unit electrolysis tanks, at least one of the unit electrolysis tanks comprising four frames (1), an anode chamber (2) and a cathode chamber (3) are arranged in the four frames (1), the anode disc (2.1) of the anode chamber (2) and the cathode disc (3.1) of the cathode chamber (3) are buckled on the four frames (1) in a back-to-back manner, an anode gas-liquid separation box (2.4) is arranged in the anode chamber (2), and a cathode gas-liquid separation box is arranged in the cathode chamber (3).

SUMMARY OF THE INVENTION

A primary object of the present invention is to provide an expandable waste water treatment system comprising a series of at least one or more treatment modules, preferably not more than two treatment modules, and a plurality of contaminant collection modules; at least one contaminant collection module comprises a contaminant collection chamber; at least one treatment module comprises a treatment tank having an inlet and an outlet and at least one collection module, and at least one treatment tank houses an anode and cathode array comprising a material selected from the group consisting of a mixed metal oxide, ion donating materials, and a combination thereof; the plurality of contaminant collection modules includes a first contaminant collection module, a last contaminant collection module, and/or one or more intermediate contaminant collection modules; the series begins with the first contaminant collection module, ends with the last contaminant collection module, and, optionally includes an intermediate contaminant collection module between treatment modules in the series; optionally the treatment module can begin with a treatment tank followed by a collection tank optionally followed by a second treatment tank; the intermediate contaminant collection module comprises an inlet and an outlet connected by an internal fluid pathway running beneath the contaminant collection chamber, wherein the inlet of the intermediate contaminant collection module interfaces with the outlet of a treatment tank of a first treatment module in the series, and the outlet of the intermediate contaminant collection module interfaces with the inlet of a treatment tank of a second treatment module in the series, and wherein the anode and cathode array are separated by at least about 0.125 inch (3.175 mm) to less than 0.5 inch (1.27 cm), preferably from about 0.125 inch (3.175 mm) to about 0.375 inch (9.525 mm), wherein the spacing is substantially uniform.

As used herein, substantially uniform spacing means that there is about 0.125 inches (3.175 mm)+ or minus 10 percent variation in spacing between and across the electrodes, and wherein the electrodes do not touch.

As an example of modular expandability, the treatment system utilizes a beginning collection chamber which is attached to a main electrolytic treatment module. A second or center collection chamber can be attached at the oppose end and where this center collection chamber is equipped to provide a fluid pathway for transferring fluid from a first into a second electrolytic treatment module. At the end of the second module, another center section can be placed for the addition of a third treatment module or an ending collection chamber can be installed to complete the treatment system, The waste water influent slated for treatment can be introduced into the system in continuous flow and where this influent is used as an electrolyte for electrical conductively between an anode and cathode array, Once DC voltage is applied to the array, micro bubbles of hydrogen and oxygen are produced, and once these bubbles generate and release from the anode and cathode arrays, they begin rising up through the water column and attach to contaminate flocculations formed by electro-chemistry reactions. Once contaminates reach the surface, they can be skimmed by a surface skimming device and deposited into either the beginning, center or ending contaminate collection chambers.

Electro-Coagulation is an electrochemistry method used to coagulate wastewater contaminates for ease of separation and collection from the wastewater stream. Wastewater when exposed to a controlled electrical field allows microscopic solids to attract, (like aluminum) organics droplets that can form higher concentrations of solids for greater removal efficiencies.

Selective material types or coatings applied to the anodes and cathodes provide several unique abilities in utilizing half redox ion reactions in which can enhance the fluid treatment process. Mixed Metal Oxidizes, (MMO) typically used are non-donators of ions to the influent and where based on the type of MMO's selected, certain electrochemistry reactions can occur. Highly oxidizing species such as peroxides and hydroxy ions are formed which can oxidize organics, metals, algae, and bacteria. If salt is present chorine and bleach can be formed as other oxidizing species.

If the influent has concentrations of hydrocarbons, the electrochemistry effect allows oily-waste water composed of suspended oil droplets interspersed with solids to neutralize and interact chemically. Therefore under suitable conditions of controlled and carefully-applied DC voltage, several unique physic-chemical effects result:

The coalescing of neutralized charges which surround hydrocarbon droplets allows them to quickly coagulate out of an emulsion. This applies to both heavy and to aromatic-hydrocarbons, with most specific results dependent upon molecular weights and their concentration within the influent.

Chemical oxidation occurs to allow the creation of free hydroxyl, OH-radicals within the influent in which rapidly and aggressively coalesce hydrocarbons, other particulate and dissolved solids. Applied DC voltage to the influent also breaks down complex organic molecules, including high molecular weight structures which may be resistant to other forms of treatment. Examples of these heavier compounds could be classified as pesticides, herbicides, dyes and wet-processed chemicals.

Biological inactivation also results from free hydroxyl radicals which rapidly and aggressively combine to destroy bacteria, viruses, cysts, macrophages and other organic biological contaminants, very similar to the effect of using ozone, but at a magnitude greater.

The electrochemistry process also works to remove metals by forming stable metallic oxides which rapidly precipitate from solution as particles which allow removal by filtration downstream of the device.

The present invention used at a constant flow rate has successfully been tested to recover and remove hydrocarbons from oil field produced water, oil ballast water, drilling fluids, gas or oil pipeline entrained water and refinery processed water. Insoluble oils and other contaminants are coalesced and skimmed from the surface for collection. As quantified by the University of California, Davis, in oil well produced water tested, an oil recovery rate of 53% is achieved with the remaining hydrocarbon constituencies (46.4%) removed by downstream filtration, achieving 99.6% overall removal efficiency.

In response to some of the aforementioned methods and systems used In the treatment of waste water will be addressed by the fields of the present invention. These and other features and advantages may be incorporated into certain embodiments of the invention which will become more fully apparent from the following description and appended claims.

Due to method redundancy required for system expansion or reduction, the present invention explanations should be interpreted as "a series of" unless otherwise noted. Therefore, once explained, the present invention does not require that all the advantageous features be described herein or be incorporated into every embodiment of the invention.

BRIEF DESCRIPTION OF THE DRAWINGS

The present invention will become more fully understood from the brief description of the accompanying drawings.

DETAILED DESCRIPTION OF THE PREFERRED EMBODIMENTS

The present invention is being presented as an affordable waste water treatment solution for industrial waste water recycling. The invention provides expandable modules in which could be used by a small "Mom and Pop" factory as well as scalable systems for large industrial applications in which to process several hundred tons of waste water daily.

Figure 1:
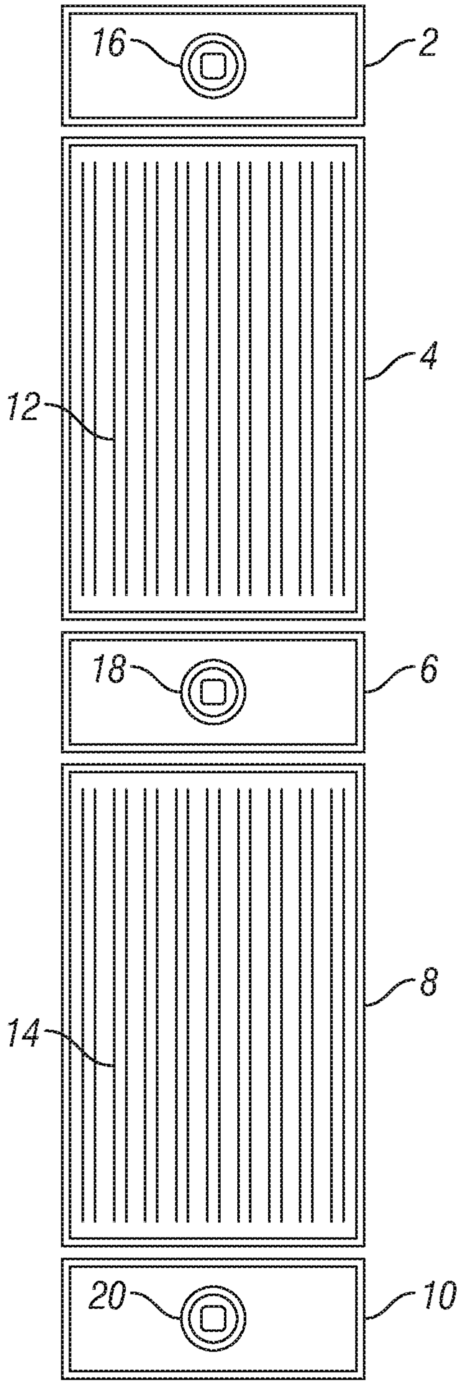
FIG. 1 illustrates the present invention as individual components required to complete an assembled system, the illustration shows three contaminates chambers in connection with two main treatment modules which house anode and cathode arrays.

FIG. 1 references a top view of the present invention which utilizes a series of 3 contaminate collection chambers 2, 6 and 10 although in this invention, 1 or 2 collection chambers are preferred. Contaminate collection chambers 2 and 10 are considered as beginning or ending chambers as per their relationship with main treatment modules 4 and 8. Main treatment modules 4 and 8 are separated by a center contaminant collection chamber 6. A first contaminate collection chamber 2 attaches to the beginning end of main treatment module 4, with a second or center contaminate collection chamber 6 placed at the opposite end of main treatment module 4. Center section chamber 6 provides an internal pathway for fluid transfer from the first treatment module 4, into a second treatment module 8. Center section collection chamber 6 would only be installed in cases where the waste water treatment system requires expansion in order to accommodate larger quantities of influent. Center section collection chamber 6 when installed allows a single treatment module to be expanded into multiples which work in tandem to treat the waste water influent.

Once the treatment system has been sized for influent volume, an ending or aft contaminate collection chamber 10 is installed to complete the treatment system.

Once contaminate chambers, 2, 6, and 10 are full of contaminates, drainage is accomplished through drains 16, 18 and 20. Contaminate chamber drainage can be achieved by individual chamber piping or the contaminate drain piping can connected together for evacuation to a centralized disposal location.

Main treatment modules 4 and 8 should be considered larger in size then collection chambers 2, 6 and 10, and where main treatment modules 4 and 8 provide housing for a series of anodes and cathodes, 12 and 14.

Once DC voltage is applied to the influent, anodes and cathodes 12 and 14 produce micro bubbles composed of hydrogen and oxygen. As these bubbles generate and release from the anodes and cathodes, they rise up through the water column and attach to contaminate flocculation formed by electro-chemistry reactions. Electro-Coagulation is an electrochemistry method used to coalesce contaminate in 1 wastewater for ease of separation and collection. Wastewater when exposed to electrically controlled fields allow microscopic solids to attract, (like magnetism) forming higher concentrations of solids for greater removal efficiencies.

Once contaminates reach the surface, they can be skimmed from the surface by a skimming device which deposits collected contaminates into either the beginning 2, center 6 or ending 10 contaminate chambers.

Figure 2:
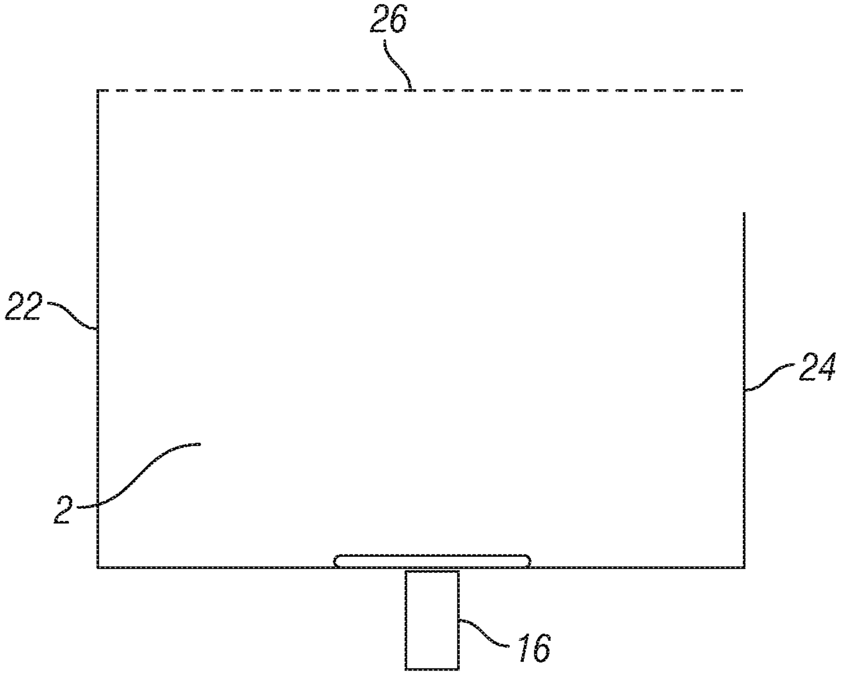
FIG. 2 illustrates a side view of the beginning contaminate chamber.
Figure 3:
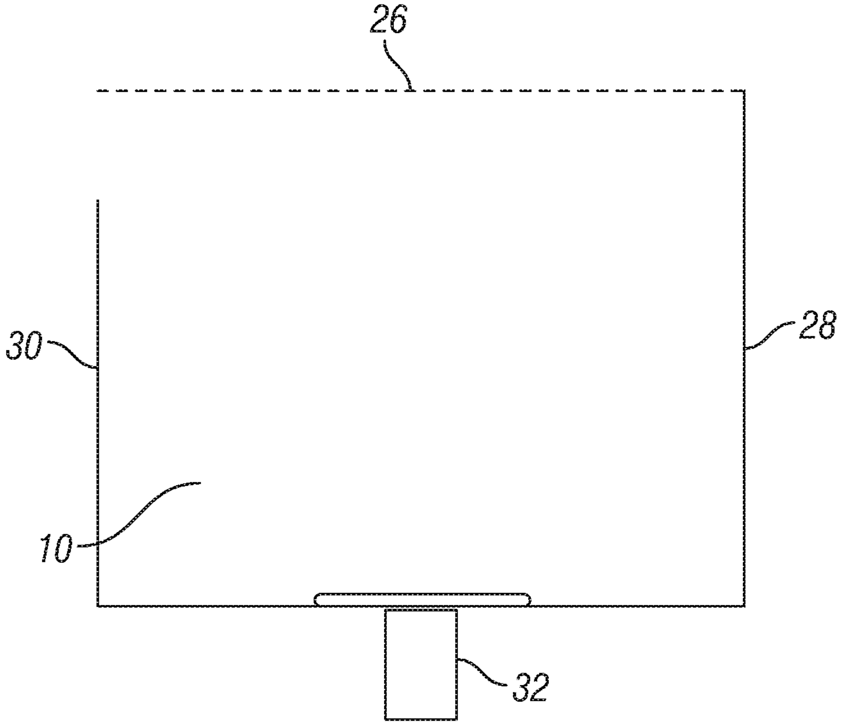
FIG. 3 illustrates a side view of the ending contaminate chamber.
Figure 4:
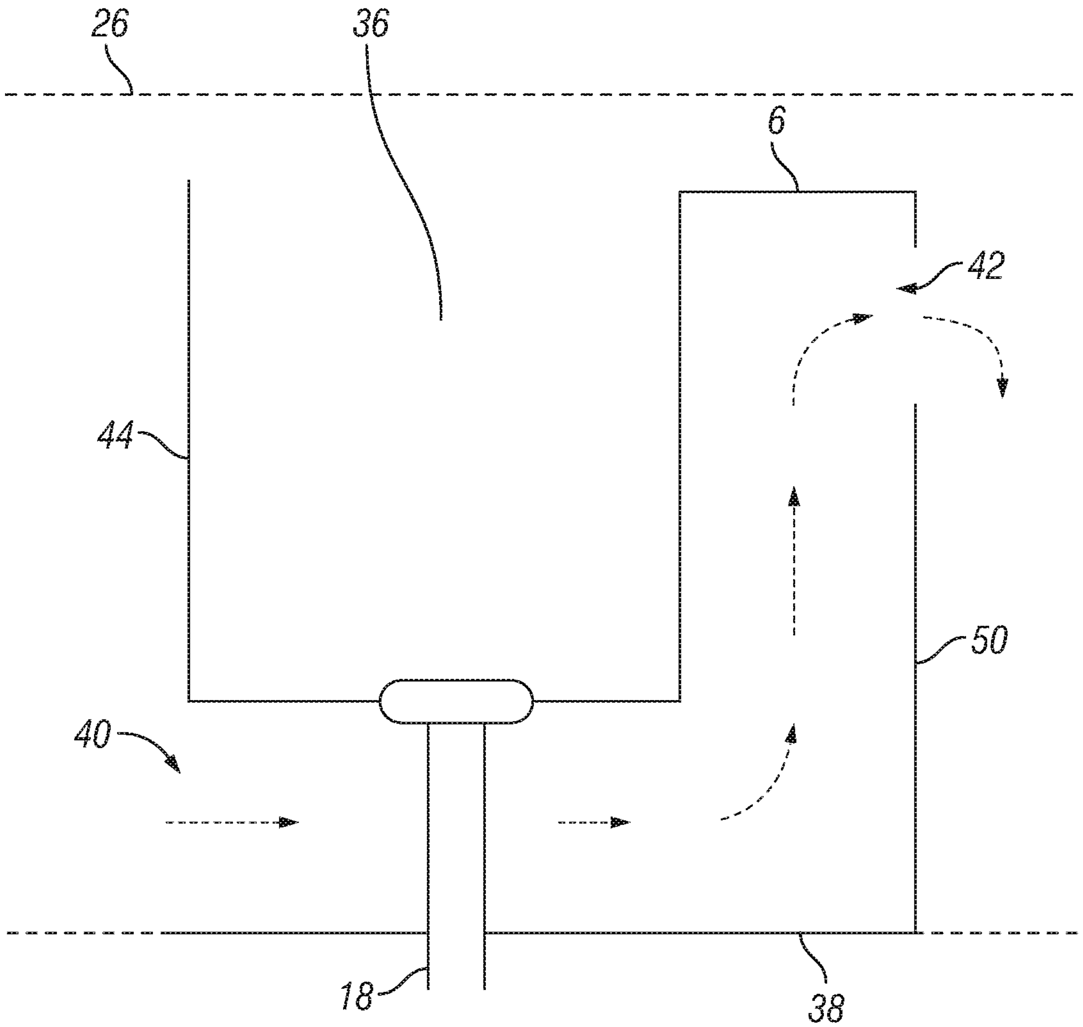
FIG. 4 illustrates a side view of the center contaminate chamber which incorporates an internal fluid pathway for fluid transfer.

Collection chamber 2 is configured slightly different than contaminate collection chamber 6 and 10 as illustrated by FIGS. 2, 3 and 4.

FIG. 2 illustrates a side view in detail of the beginning contaminate collection chamber 2. Contaminate collection chamber 2 should be considered the beginning chamber for the first main treatment module 4, as referenced in FIG. 1.

Outward facing wall 22 is configured at the same elevation as exterior side walls 26. Side walls 26 are taller in elevation than interior wall 24 and where interior wall 24 is configured lower to allow the entry and depositing of contaminates from the skimming device, into the collection chamber.

Collection chamber 2 is further equipped with a centralized drain 16 which is used to evacuate collected contaminates.

In reference to FIG. 3, ending collection chamber 10 is configured slightly different than beginning contaminate collection chamber 2 and center section 6. FIG. 3 illustrates a side view in detail of the ending contaminate collection chamber 10. Contaminate collection chamber 10 should be considered the ending chamber for a single, or: the ending chamber for a series of multiple treatment modules 8, (as referenced in FIG. 1). Outward facing wall 28 is configured at the same elevation as exterior side walls 26, which are taller in elevation than interior wall 30, interior wall 30 is configured to allow entry and depositing of contaminates from the skimming device onto the collection chamber.

Collection chamber 10 is equipped with a centralized drain 32 used to evacuate collected contaminates from the chamber, Now in reference to FIG. 4, collection chamber 6 is configured to allow fluid passage from the first treatment module into a next while retaining contaminates collection and storage capabilities 36. Contaminate collection area 36 is formed by interior walls 44 and 50 and exterior side walls 26 which form a sealed enclosure located just above fluid pathway 40. Fluid entry into the center section enters at floor level 38 through opening 40 which shares a mirrored opening with treatment module wall 44. The enclosure further incorporates a contaminate drain 18 to allow collected contaminates evacuation from the enclosure.

Transferring fluid must traverse around drain pipe 18 which is sealed to the bottom floor of the contaminate chamber and to floor 38 of the center section to prevent traversing fluid from escaping the pathway.

Fluid transfer is based on fluid dynamics where fluid—weight achieved by the accumulation of fluid delivered into the treatment module by an electrical fluid pump. This maintains the fluid level within the first treatment module and maintains constant fluid pressure in which forces the fluid through and up into center collection chamber opening 42. Maintained accumulated fluid levels force and allow the fluid to transverse the internal pathway to produce a continuous flow of fluid into a second treatment module. The elevation of fluid opening 42 also helps to control fluid resonance time for electrochemistry reactions to occur prior to fluid transfer from the first into the second treatment module. Upon fluid treatment, a secondary electrical fluid pump is used to evacuate the effluent downstream of the treatment system allowing for the fluid flow in the tank.

Figure 5:
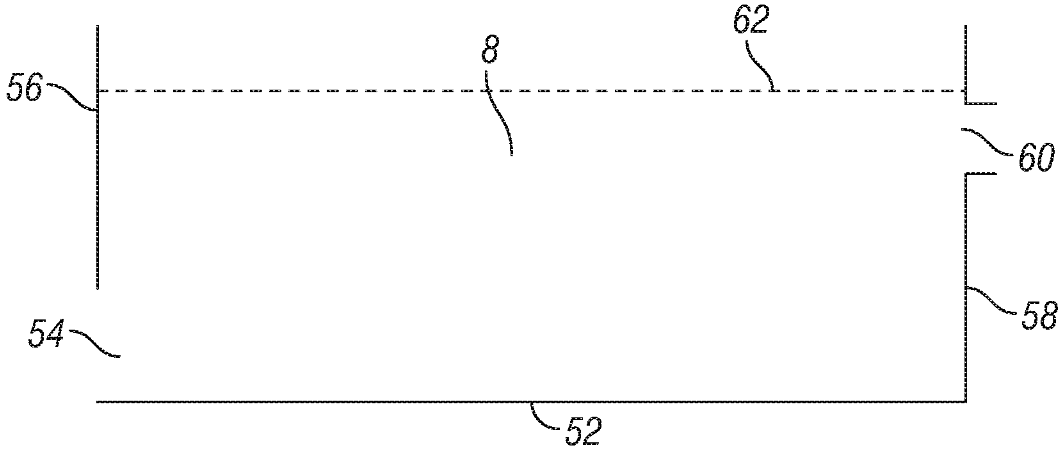
FIG. 5 illustrates a side view of a main treatment module having provisions for inter connections to individual contaminate collection chambers, the interconnections being used for system expansion or reduction.

In reference to FIG. 5, this illustration may require a left to right rotation of the module drawing to understand how the mating of sections is fully achieved.

FIG. 5 illustrates incorporated fluid opening 54 and fluid exit 60 located within outward walls, 56 and 58 of treatment module 8. Interior wall 56 when mated to the center section wall 44, (FIG. 4) shares a mirrored opening 54 with opening 40 located within center section interior wall 44. These two openings when mated allow fluid flow from the center section into the next treatment module.

Fluid exit is achieved through wall opening 42 located within outward wall 50 of the center section, (FIG. 4). When mated, wall opening 42 shares a mirrored opening with opening 60 located within outward wall 58 of the treatment module.

Figure 6:
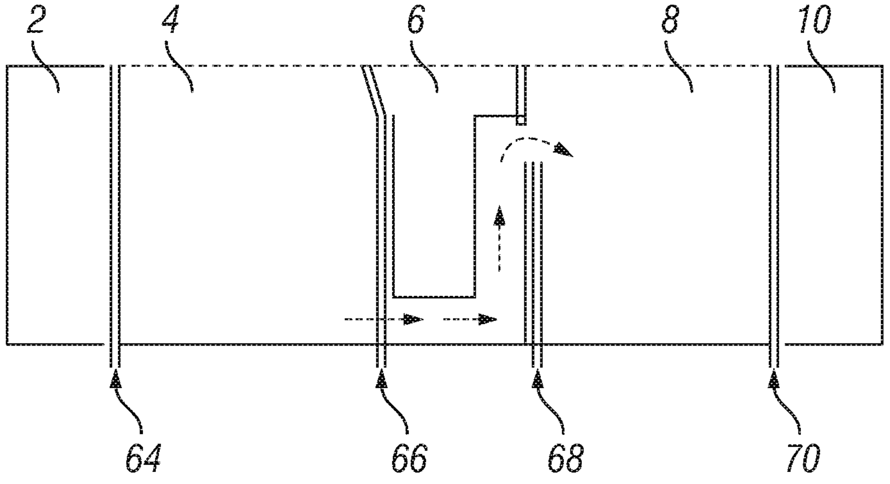
FIG. 6 illustrates a side view of an assembled system which employs outer flanges for contaminate chamber and main treatment module connection.

FIG. 6 illustrates individual components incorporating outward facing positioned flanges used to connect a next in line component. For example, center section chamber 6 would require two flanges 66 and 68, which are used to connect module 4 to module 8, Flange 64 would be used to attach the beginning contaminate chamber 2 and where flange 70 would be used to attach an additional center section 6 for system expansion, or flange 70 would be used to attach an ending contaminate collection chamber 10 for system completion.

Figure 7:
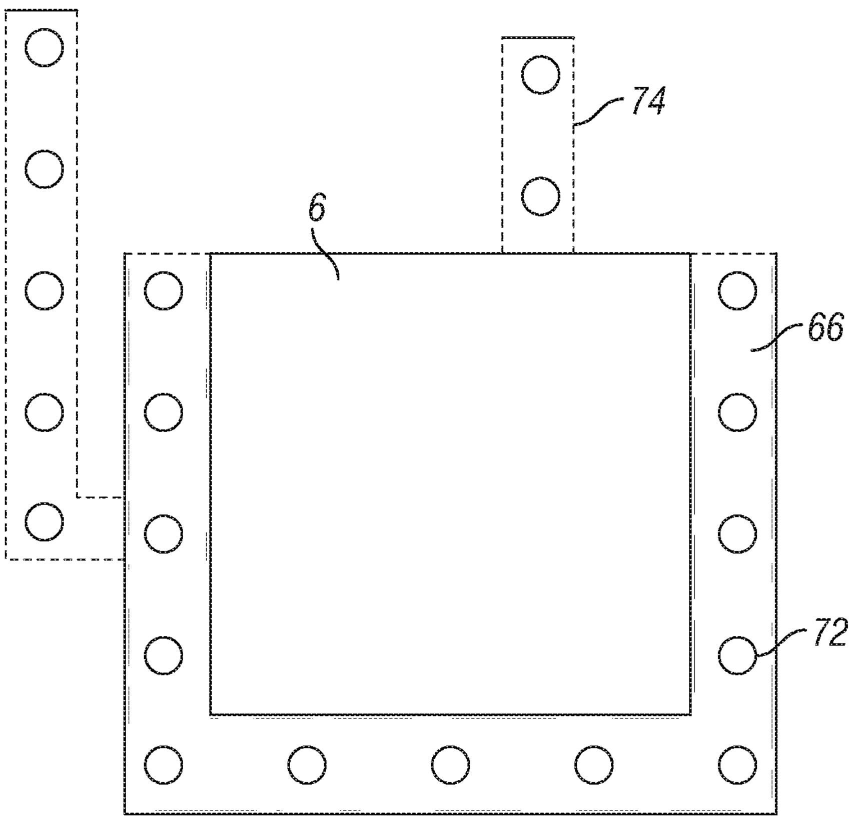
FIG. 7 illustrates a side view of a flange assembly used to connect system components.

FIG. 7 illustrates the preferred method for securing the contaminate chambers to the main treatment modules by using a series of nuts and bolts placed through incorporated holes 72 in outward facing flanges 64, 66, 68 and 70, (FIG. 6). These outward facing flanges are located at least one end of the chambers around the bottom of chambers 2, 6, 10, and around the outer walls of treatment modules 4 and 8, This method would require the use of a gasket 74 placed between the flanges to prevent fluid leakage from the individual components in which interface with the waste water fluid.

Flange 66 and all other flanges incorporates a series of holes 72 used to house a series of nuts and bolts in which when tighten, applies sealing pressure to the "U" shape gasket 74 when fully tighten and mates to the flange surface. As for example, flange 66 would be constructed as a permanent fixture on at least one of the contaminate chambers and treatment modules. Flange 66 is mainly used to attach system components to allow system expansion or reduction as required by the waste water treatment process.

Figure 8:
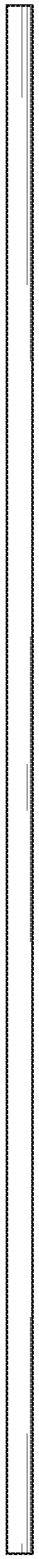
FIG. 8 illustrates a solid rod, generally aluminum, which acts as an anode when an electromotive force (EMF) is induced between it and another conductive material.

FIG. 8 illustrates a solid rod, generally aluminum, which acts as an anode when an electromotive force (EMF) is induced between it and another conductive material.

Figure 9:
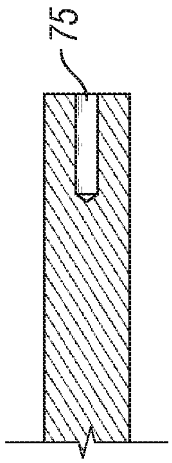
FIG. 9 illustrates the vertical cross sectional view of the end of FIG. 8.

FIG. 9 illustrates a vertical cross sectional view of the end of FIG. 8. Item 75 in FIG. 9 and FIG. 10 represents a threaded hole which allows a current carrying electrode to be attached to it with the other end of the electrode being attached to an a devices such as a DC power supply.

Figure 10:
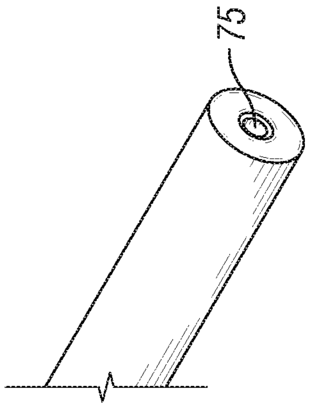
FIG. 10 illustrates the three (3) dimensional view of the end of FIG. 8.

FIG. 10 illustrates the three (3) dimensional view of the end of FIG. 8.

Figure 11:
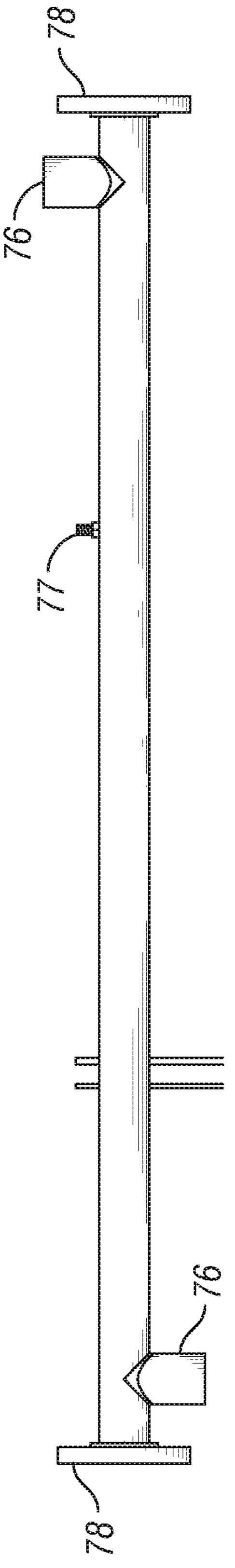
FIG. 11 illustrates a pipe, generally a conductive material such as stainless steel, which acts as a cathode when an electromotive force (EMF) is induced between it and another conductive material.

FIG. 11 illustrates a pipe, generally a conductive material such as stainless steel, which acts as a cathode when an electromotive force (EMF) is induced between it and another conductive material. Item 76 is a welded coupling of the same material as the pipe. It allows for the transport of fluid into and out of the pipe. Item 78 is a pipe coupling and item 77 is a threaded member which allows a current carrying electrode to be attached to it with the other end of the electrode being attached to an EMP device such as a DC Power Supply.

Figure 12:
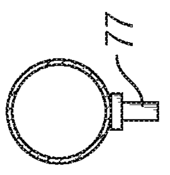
FIG. 12 illustrates the vertical cross sectional view of FIG. 11 cut through item detail 77.

FIG. 12 illustrates the vertical cross sectional view of FIG. 11 cut through item detail 77.

Figure 13:
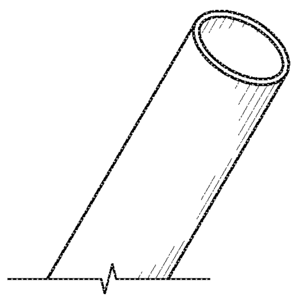
FIG. 13 illustrates the three (3) dimensional view of FIG. 8 cut through a vertical cross section of the pipe.

FIG. 13 illustrates the three (3) dimensional view of FIG. 8 cut through a vertical cross section of the pipe.

Figure 14:
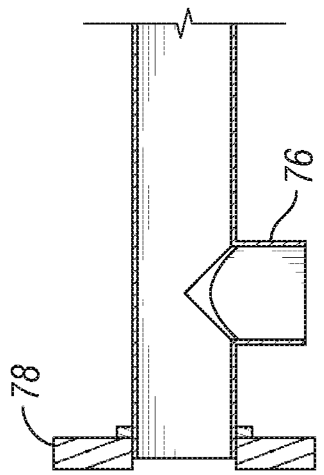
FIG. 14 illustrates the horizontal cross sectional view of the end of FIG. 11.

FIG. 14 illustrates the horizontal cross sectional view of the end of FIG. 11.

Figure 15:
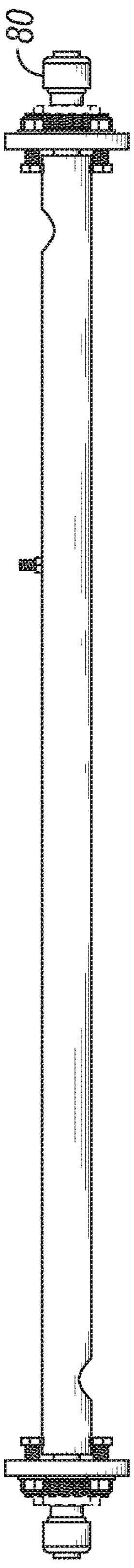
FIG. 15 illustrates the assembly of FIG. 8 located concentrically inside of FIG. 11.

FIG. 15 illustrates the assembly of FIG. 8 located concentrically inside of FIG. 11. Item 80 is a bushing that is welded to item 79 thereby preventing liquid to leak flowing through an annular space (not shown) between FIG. 8 and FIG. 11.

Figure 16:
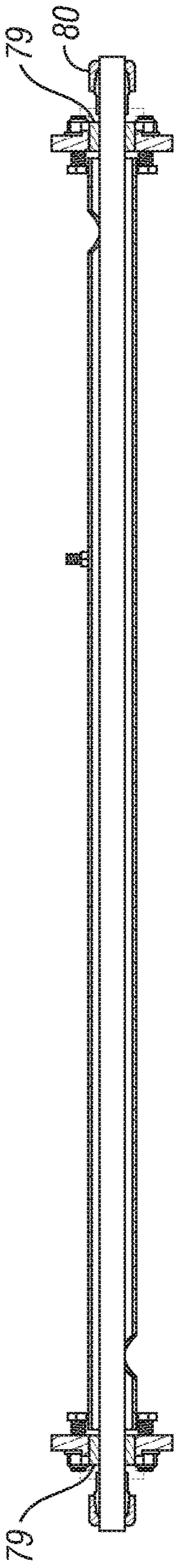
FIG. 16 illustrates is a horizontal cross sectional view of FIG. 15.

FIG. 16 illustrates is an assembly of FIG. 8 mounted inside of FIG. 11. An EMF induced by a devise allows current to flow inside an annular space via a conductive liquid flowing through the annular space.

Figure 17:
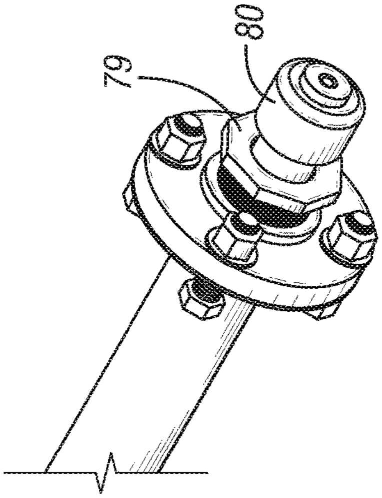
FIG. 17 illustrates the three (3) dimensional view of the end of FIG. 15.

FIG. 17 illustrates the three (3) dimensional view of the end of FIG. 16.

Improved Mixing in EMF Equipment and Ultrasonic Example

The mixed metal oxide (iridium and ruthenium oxides), MMO, electrode is classified as an "active" electrode (Martinez-Huitle) with respect to the oxygen evolution reaction. Carbon and platinum electrodes are also "active". One proposed mechanism is described as follows.

Active anode materials participate in the OH— based oxidation reactions, forming first a physisorbed hydroxyl radical (M(·OH)) at anode site M.

$$M + H_2O \Rightarrow M(\cdot OH) + H^+ + e-$$

The surface of active anodes interacts strongly with the ·OH to form a superoxide (MO).

$$M(\cdot OH) \Rightarrow MO + H^+ + e-$$

The redox couple MO/M acts as a mediator for oxidation of organics (R).

$$MO+R \Rightarrow M+RO$$

Since the active "superoxide" is on the electrode surface, mass transfer to the surface is important as is transport of reacted material away from the surface. For the oxidation reaction mass transfer controls the overall reaction rate.

Embodiments to provide enhanced mixing would be, for example, ultrasonic excitation of the fluid between the electrodes, vibration of the electrodes themselves, directed flow to the electrode surface such as with baffles, mechanical agitation of the process fluid, or other means familiar to those skilled in the art. By way of demonstration the rate of oxidation of dissolved organic specie measurably increases when the beaker containing energized electrodes and untreated solution is placed in an ultrasonic water bath at 45 kHz.

Example 1. Ultrasonic Mixing

A test fluid is prepared comprising 1% vegetable glycerin (min purity 99.7%) in deionized water. During electrolysis the glycerin is oxidized to a number of products. Carbon Oxygen Demand (COD) is used as the analytical measurement to follow the glycerin oxidation over time.

407 grams of the 1% glycerin solution are placed in a 500 ml beaker. 4.11 grams NaCl are added to make a 1% NaCl solution. The NaCl is necessary to generate current flow between the electrodes.

Aluminum electrodes are inserted into the beaker. For 10 minutes 15.6 volts are applied to generate a current of 1.2-1.4 amps. The aluminum electrodes are removed. An anode of expanded titanium metal with a mixed metal oxide coating (50/50 ruthenium oxide/iridium oxide) is inserted into the beaker along with an expanded metal titanium cathode. The anode and cathode are separated by 1 cm.

The beaker with electrodes is set into an ultrasonic water bath at 45 kHz. A 10 amp current is established between the electrodes for 180 minutes. Samples are taken periodically and analyzed for COD.

An identical control experiment is conducted with the beaker sitting outside of the sonic bath—no agitation.

Results are shown below

| Time, min | No Agitation COD, ppm | Sonic Agitation COD, ppm |
|---|---|---|
| 0 | 14000 | 14000 |
| 60 | 11910 | 8150 |
| 120 | 7900 | 1040 |
| 180 | 4850 | 600 |

The above description of the invention reveals what would be obvious for variation and where such variations are not to be considered a deviation from the scope of the invention. Therefore such modifications which are obvious to persons skilled in the art are also to be considered comprised by the scope of the succeeding claims.

We claim:

1. A waste water treatment system comprising:

at least one treatment tank and one or two contaminant modules, the treatment tank housing at least one anode and cathode array, wherein the anode and cathode of the array at least one comprises a material selected from the group consisting of at least one mixed metal oxide, ion donating materials, and a combination thereof, a skimming device that removes flocculated contaminates at an upper surface of a fluid contained in the at least one treatment tank and deposits at least a portion of the removed flocculated contaminates into the one or two contaminant modules; and a drain that allows for removal of the contaminants from the contaminant module;

wherein the anode and cathode array are oriented in a non-circular relationship to one another and wherein the treatment tank comprises an ultrasonic water bath.

2. The waste water treatment system of claim 1, wherein at least one anode and cathode of the array comprises a coating, said coating utilizing half redox ion reactions.

3. The waste water treatment system of claim 1, further comprising a controlled fluid duration element for electrical exposure within a treatment tank.

4. The waste water treatment system of claim 1, wherein the skimming device comprises a traversing ability to intersect with the or two contaminant modules.

5. The waste water treatment system of claim 1 further comprising a DC power source.

6. The waste water treatment system of claim 5, wherein the DC power source is operatively connected to the anode and cathode array.

7. The waste water treatment system of claim 1 further comprising an electrical powered fluid pump.

8. A waste water treatment system comprising:

at least one treatment tank and one or two contaminant modules, the treatment tank housing at least one oxidizing species generating anode and cathode array, wherein the anode and cathode of the array at least one comprises a material selected from the group consisting of at least one mixed metal oxide, ion donating materials, and a combination thereof, and wherein the anode and cathode array are separated by at least about ⅛ inch to less than ½ inch, wherein the spacing is uniform and wherein the anode and cathode array are oriented in a non-circular relationship to one another.

9. The waste water treatment system of claim 8, wherein the at least one oxidizing species generating anode and cathode array generates peroxide ions, hydroxyl ions, or a combination thereof.

10. The waste water treatment system of claim 8, wherein at least one peroxide ion generating anode and cathode of the array comprises a coating, said coating utilizing half redox ion reactions.

11. The waste water treatment system of claim 8, further comprising:

a skimming device that removes flocculated contaminates at an upper surface of a fluid contained in the at least one treatment tank and deposits the flocculated contaminates into the contaminant module; and a drain that allows for removal of the contaminants from the contaminant module.

12. The waste water treatment system of claim 8, further comprising a controlled fluid duration element for electrical exposure within a treatment tank.

13. The waste water treatment system of claim 11, wherein the skimming device comprises a traversing ability to intersect with the one or two contaminant modules.

14. The waste water treatment system of claim 8 further comprising a DC power source.

15. The waste water treatment system of claim 14, wherein the DC power source is operatively connected to the anode and cathode array.

16. The waste water treatment system of claim 8 further comprising an electrical powered fluid pump.

17. The waste water treatment system of claim 8 wherein the anode and cathode array oriented in a non-circular relationship to one another are aligned with one another.

* * * * *